United States Patent [19]

Borsh et al.

[11] 4,443,031
[45] Apr. 17, 1984

[54] CONNECTOR FITTING FOR CONNECTING CORRUGATED CONDUIT SECTIONS

[75] Inventors: Richard J. Borsh, Chagrin Falls, Ohio; Steven W. Neff, Clinton, Iowa; Harold T. Pate, Solon, Ohio

[73] Assignee: Thyssen-Bornemisza Inc., New York, N.Y.

[21] Appl. No.: 439,045

[22] Filed: Nov. 4, 1982

[51] Int. Cl.³ .............................................. F16L 21/06
[52] U.S. Cl. .............................. 285/419; 285/DIG. 4; 285/DIG. 22
[58] Field of Search ................. 285/419, DIG. 4, 373, 285/DIG. 22

[56] References Cited

U.S. PATENT DOCUMENTS

| | | | |
|---|---|---|---|
| 3,229,998 | 1/1966 | Pennington | 285/419 |
| 3,456,965 | 7/1969 | Gajewski et al. | 285/419 X |
| 3,711,633 | 1/1973 | Ghirardi et al. | 285/DIG. 4 X |
| 4,168,091 | 9/1979 | Boomgarden et al. | 285/DIG. 4 X |
| 4,171,834 | 10/1979 | Abner | 285/DIG. 4 X |
| 4,248,459 | 2/1981 | Pate et al. | 285/DIG. 4 X |
| 4,273,367 | 6/1981 | Keeney et al. | 285/419 |
| 4,405,161 | 9/1983 | Young et al. | 285/373 X |

Primary Examiner—Thomas F. Callaghan
Attorney, Agent, or Firm—Laney, Dougherty, Hessin & Beavers

[57] ABSTRACT

A connector fitting for interconnecting flexible corrugated conduit sections which includes a pair of arcuate sections joined by flexible straps and having corrugation-engaging ribs which engage the corrugation conduit sections when the arcuate sections of the fitting are closed about the conduit sections. In the closed position, the two arcuate conduit sections are interlocked by means of tongues carried on each of the arcuate sections, which tongues engage a slot carried on the other of the arcuate sections.

3 Claims, 9 Drawing Figures

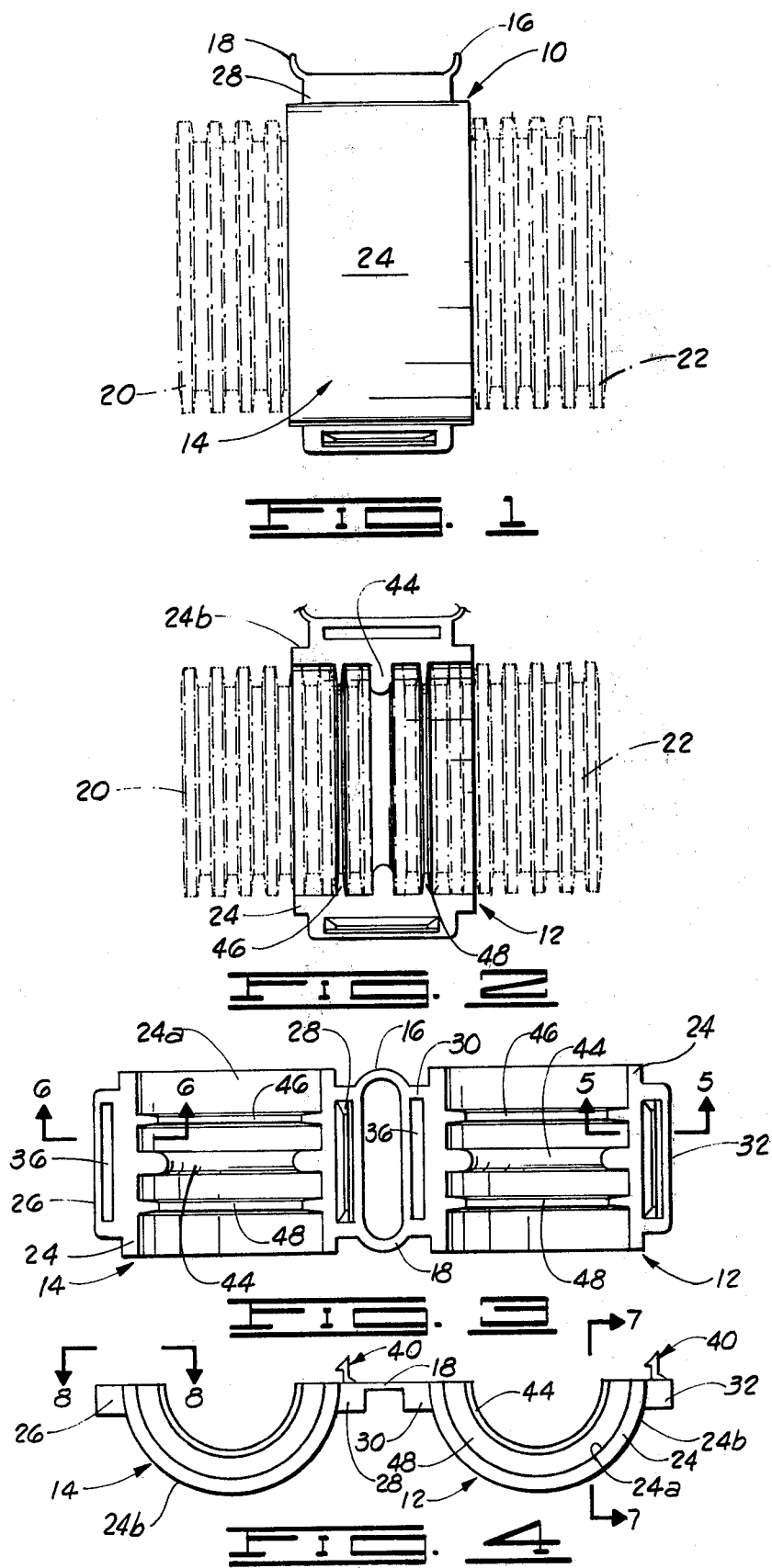

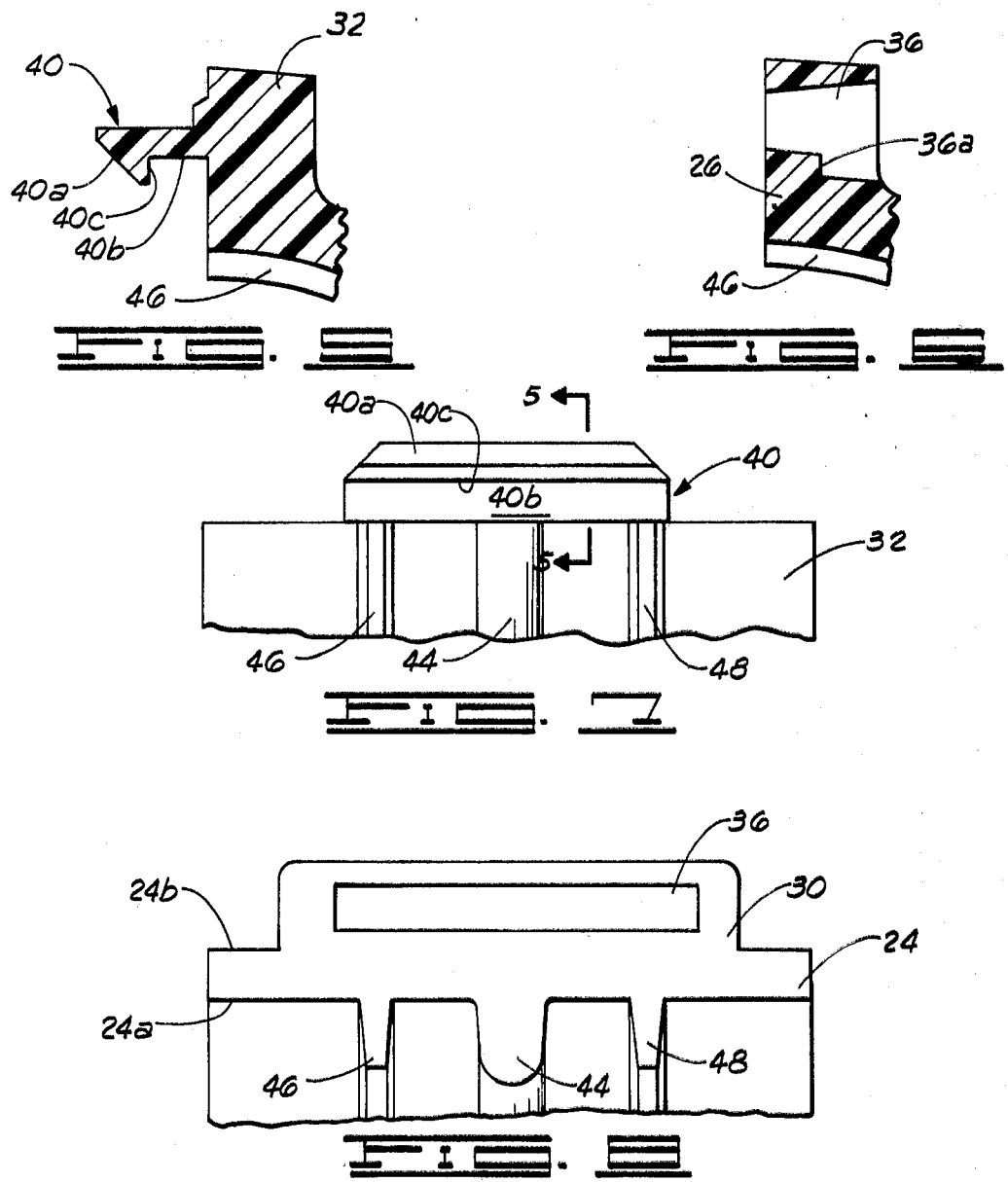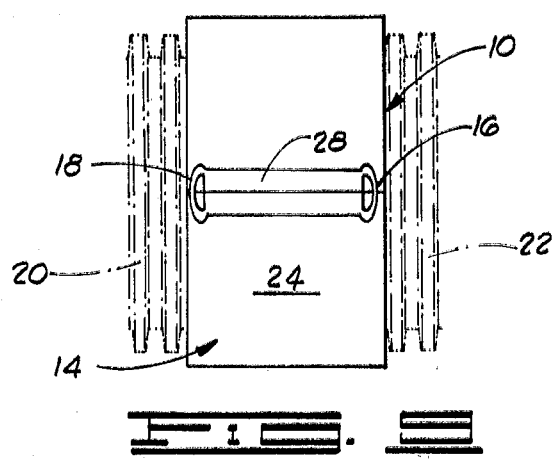

CONNECTOR FITTING FOR CONNECTING CORRUGATED CONDUIT SECTIONS

BACKGROUND OF THE INVENTION

1. Field of the Invention

This invention relates to joining or coupling devices, and more particularly, to synthetic resin connector couplings employed for interconnecting a pair of flexible corrugated conduit sections of the type employed as a raceway or encasement for electrical conductors and the like.

2. Brief Description of Prior Art

Various types of sleeves, fittings or couplings have been employed for connecting pipe and conduit sections in end-to-end relation. Particularly, several types of clamps or couplings have been employed for the purpose of engaging corrugated conduit sections of the sort used to enclose electrical conductors and like. Typical of such conduit engaging clamps, couplings and fittings are those which are disclosed in U.S. Pat. No. 4,248,459, assigned to the assignee of the present invention, and in U.S. Pat. Nos. 1,275,439; 3,501,179; 3,711,632 and 3,711,633.

BRIEF DESCRIPTION OF THE PRESENT INVENTION

The present invention provides an improved connector fitting for interconnecting a pair of corrugated conduits (in end-to-end relation) so that the conduits are held in fixed relation to each other, and the fitting forms an enclosure which surrounds the gap between the conduits to protect electrical conductors or the like which are ensheathed by, or extend through, the conduit.

Broadly described, the connector fitting of the invention is a two part structure made up of a pair of arcuate sections or parts which are complementary in configuration, and which, when in a closed position, form a short tubular element having a bore therethrough into which the ends of the interconnected conduit sections are projected. Each of the arcuate sections of the connector fitting is provided on its concave inner surface with two or more corrugation-engaging ribs or protuberances which project between external corrugations carried on the conduit sections being interconnected, and thus interlock with the conduit sections when the two arcuate fitting sections are closed about the aligned conduit sections. The two arcuate sections of the fitting are flexibly joined to each other by flexible strap means, and are interlocked in the closed position by means of a male tongue element which projects from each of the sections and interlocks in a female socket element or lug carried on each of the sections.

The strap means utilized are a pair of opposed, thin, semi-circular bands which are located at opposite side edges of the arcuate sections, and the tongue elements project tangentially with respect to the convex outer periphery of the arcuate sections of the connector fitting upon which they are located.

An important object of the present invention is to provide a connector fitting by which two sections of corrugated conduit or pipe can be very quickly coupled to each other in a semi-permanent fashion.

Another object of the invention is to provide a connector fitting by the use of which externally corrugated pipes or conduits can be coupled in end-to-end relation so that the hollow bores or passageways through the conduit sections are placed in communication with each other through a bore formed through the connector fitting, thus providing a continuous enclosure for electrical conduits or the like extended through the aligned conduit sections.

A further object of the invention is to provide a connector fitting used to interconnect sections of flexible corrugated conduit, which fitting can be very quickly and easily used to interconnect a pair of corrugated conduits in end-to-end relation, while maintaining a slight spacing between the ends of the two conduits.

A further object of the present invention is to provide a relatively economically manufactured, yet mechanically strong and serviceable connector fitting which can be employed for interconnecting corrugated conduit sections used in an electrical service system.

Additional objects and advantages will become apparent from the following detailed description of a preferred embodiment of the invention as the same is read in conjunction with a perusal of the accompanying drawings which illustrate such preferred embodiment.

FIG. 1 is a side elevation view of the connector fitting of the present invention as it appears when in use for joining a pair of corrugated conduit sections. The end portions of a pair of corrugated conduits which are engaged by the connector fitting are shown in dashed lines.

FIG. 2 is an elevation view of a semi-cylindrical connector fitting section as it appears when utilized in conjunction with a second semi-cylindrical section for joining, in end-to-end relation, a pair of corrugated conduit sections. Portions of such corrugated conduit sections are illustrated in dashed lines.

FIG. 3 is a plan view of the connector fitting of the invention as it appears when the semi-cylindrical sections thereof are opened apart from each other to facilitate insertion therebetween of the end portions of a pair of corrugated conduit sections.

FIG. 4 is an end elevation view of the semi-cylindrical sections of the connector fitting of the invention as they appear when they are opened apart from each other for purposes of receiving a pair of corrugated conduit sections which are to be joined by means of the connector fitting.

FIG. 5 is a sectional view taken along line 5—5 of FIG. 3.

FIG. 6 is a sectional view taken along line 6—6 of FIG. 3.

FIG. 7 is a view in elevation of a male engaging tongue forming a part of the connector fitting of the invention, and taken along line 7—7 of FIG. 4.

FIG. 8 is a view in elevation of a female receptor slot forming a part of the connector fitting of the invention, and taken along line 8—8 of FIG. 4.

FIG. 9 is a plan view of the connector coupling joining a pair of corrugated conduit sections.

DETAILED DESCRIPTION OF A PREFERRED EMBODIMENT OF THE INVENTION

Referring initially to FIG. 1 of the drawings, the connector fitting of the invention is designated generally by reference numeral 10. The connector fitting includes a pair of arcuate, preferably semi-cylindrical, sections 12 and 14 which are flexibly and moveably interconnected by a pair of flexible connecting straps 16 and 18.

The connecting straps 16 and 18 are thin bands of semi-circular configuration which have the shape shown in FIG. 3 when the connector fitting sections are opened apart as shown in FIG. 3, and have the shape shown in FIG. 9 when the fitting sections are closed up as shown in FIGS. 1 and 9. The sections 12 and 14 are preferably complementary in configuration so as to define a cylindrical bore through the center thereof when they are closed together in a manner and for a purpose hereinafter described. The connector fitting 10 is utilized for clampingly engaging in end-to-end relation, a pair of sections of a corrugated conduit of the type utilized, for example, as a raceway for electrical conductors. A pair of such corrugated conduit sections 20 and 22 are illustrated in dashed lines in FIG. 1, and are there shown in their positions relative to each other and to the connector fitting when the fitting is used for joining and clampingly engaging the corrugated conduit sections.

Each of the sections 12 and 14 of the connector fitting 10 is characterized in having a body portion 24 which has a concave inner surface 24a and a convex outer surface 24b. The body portion 24 of the connector fitting section 14 carries a female receptor lug 26 at one end of the body portion and a male engaging lug 28 at the other end of the body portion. At the end of the body portion 24 of the connector fitting section 12 which is adjacent the male engaging lug 28, the body portion 24 of the section 12 carries a female receptor lug 30. At the opposite end of this body portion 24, a male engaging lug 32 is provided. The several lugs 26-32 described as carried on the body portions 24 of the sections 12 and 14 project radially from the body portions as illustrated in FIG. 4. The male engaging lug 28 carried on the body portion 24 of the section 14 is connected to the female receptor lug 30 carried on the body portion 24 of the section 12 by means of the relatively then flexible connecting straps 16 and 18 as illustrated in FIG. 3.

As illustrated in FIGs. 3 and 6, each of the female receptor lugs 26 and 30 is provided with an elongated receptor slot 36. Each receptor slot 36 has a cross sectional configuration of the type illustrated in FIG. 6 where it will be noted that the receptor slot is provided with an undercut shoulder 36a.

Each of the male engaging lugs 28 and 32 includes a male engagement tongue 40 which is illustrated in elevation in FIG. 4 and in enlarged section in FIG. 5.

It will be noted that the male engagement tongue 40 carried on each of the male engaging lugs 28 and 32 projects substantially parallel to a tangent to the convex outer peripheral surface 24b of the respective body portions 24 of the two connector fitting sections 12 and 14. It will be further noted that each male engagement tongue 40 carries an enlarged head 40a which is joined to its respective lug by a web portion 40b. The head 40a of the male engagement tongue 40 tapers to a relatively small or pointed end so as to facilitate the entry of the male engagement tongue into the female receptor slot. The head 40a of the male engagement tongue has an inner terminus defined by an abrupt shoulder 40c which is dimensioned and configured to engage the shoulder 36a of a female receptor slot when the two semi-cylindrical sections of the connector fitting are interengaged for the purpose of clamping registry with the end portions of joined sections of corrugated pipe.

On the concave inner surface 24a of each of the semi-cylindrical sections 12 and 14, a radially protuberant partition rib 44 of semi-circular configuration is positioned. Spaced axially from the partition rib 44, and disposed on opposite sides thereof are a pair of corrugation-engaging ribs 46 and 48. The corrugation-engaging ribs 46 and 48 are also of semi-circular configuration, and are dimensioned to interfit with corrugations carried by corrugated conduit sections joined by the connector fitting 10.

In the utilization of the connector fitting of the invention, the semi-cylindrical sections 12 and 14 of the fitting are opened apart from each other to the position illustrated in FIGS. 3 and 4. In this position, the sections 12 and 14 are held together by the flexible straps 16 and 18. When the sections 12 and 14 are thus opened apart, a pair of corrugated conduit sections 20 and 22 are placed in end-to-end relation to each other with their opposed ends spaced and located on opposite sides of the partitioning rib 44 of one of the two semi-cylindrical sections 12 or 14. The corrugated conduit sections are positioned so that the corrugation-engaging ribs 46 and 48 project between adjacent crests of corrugations formed externally about the corrugated conduit sections, and are thus engaged with the corrugations on the conduit sections.

With the corrugated conduit sections 20 and 22 thus positioned in relation to one of the semi-cylindrical sections 12 or 14, the other semi-cylindrical section of the connector fitting is then pivoted to a closed position in which it mates with, and forms a cylindrical enclosure with, its interconnected mating semi-cylindrical section. In this position, the ribs 46 and 48 on the section which is closed up in the manner described interengage the corrugations carried on the corrugated conduit sections in identical fashion to that which has been described as characteristic of ribs on the first semi-cylindrical section.

As the second semi-cylindrical section is closed about the corrugated conduit sections 20 and 22, the two male engaging tongues 40 snap into the female sockets 36 so that the shoulder 40c carried on each of these tongues engages the corresponding shoulder 36a formed within the respective female socket.

It will be noted that when the semi-cylindrical sections of the fitting are closed and locked in the manner described, the corrugated conduit sections are securely clamped in fixed position relative to each other at the end portions thereof, yet the connector fitting of the invention is relatively short, and flexibility and freedom of movement of the corrugated conduits beyond their point of juncture is not affected. The inclusion of the thin spaced connecting straps 16 and 18 facilitate rapid clamping action and allow greatest flexibility in the fitting with adequate connecting strength. Moreover, when the connector fitting is clamped about the corrugated conduit sections in the manner described, it provides a substantially continuous enclosing sleeve through which an electrical conductor or the like can be extended from one of the conduit sections into the other without external exposure. Importantly, the positive interlock at diametrically opposite sides of the fitting, as afforded by the location of the male-female engagement at such opposite sides, assures secure and long lasting conduit engagement.

Although a preferred embodiment of the invention has been herein described, in order to afford adequate guidelines to those skilled in the art that the invention can be easily practiced, it will be understood that various changes and innovations in the precise structure illustrated in the drawings and herein described can be effected without departure from the basic principles of the invention. Changes and innovations of this type are therefore deemed to be circumscribed by the spirit and scope of the invention, except as the same may be necessarily limited by the appended claims or reasonable equivalents thereof.

What is claimed is:

1. A connector fitting for interconnecting a pair of flexible corrugated conduit sections comprising:

a pair of complementary arcuate sections each including:

a semi-cylindrical body portion having arcuate, semi-cylindrical corrugation-engaging ribs carried on the concave inner surface thereof and spaced axially from each other along the body portion, said body portion further having axially opposite ends and opposed side edges lying in, and defined by, a diametric plane of said semi-cylindrical body portion;

a female receptor lug carried on one side edge of the semi-cylindrical body portion, extending axially across a major portion of the axial dimension of the semi-cylindrical body portion, and projecting radially outwardly from the convex outer surface of the body portion at a location immediately adjacent said diametric plane, said female receptor lug having an elongated receptor slot therein extending substantially parallel to the axis of the semi-cylindrical body portion, said receptor slot defining an undercut, radially extending shoulder spaced inwardly in the lug from the face of the lug nearest said diametric plane;

a male engagement tongue carried on the opposite side edge of the semi-cylindrical body portion from the female receptor lug and mounted on the convex outer surface of the body portion, said male engagement tongue projecting substantially tangentially to the convex outer surface and in a direction which is substantially normal to said diametric plane, and on the opposite side of said diametric plane from said body portion, said engagement tongue including an enlarged head; and a web portion connected to the head and extending axially with respect to, and spaced radially outwardly from, the body portion, said head being tapered over its radial thickness to facilitate entry into the slot in the female receptor lug when the pair of complementary arcuate sections are snapped together to form a cylindrical connector fitting, and said male engagement tongue further including a radially extending shoulder at the intersection of the web portion with the enlarged head, said radially extending shoulder disposed on the radially inner side of said web portion; and a male engaging lug secured to said opposite side edge of the semi-cylindrical body portion and projecting radially outwardly from the convex outer surface thereof at a location to substantially abut said female receptor lug when said pair of complementary arcuate sections are snapped together by interengaging the shoulders carried on said male engagement tongues with the undercut shoulders defined within said female receptor lugs, said male engaging lug connected to said web portion of the male engaging tongue and spacing the web portion and the enlarged head carried thereby radially outwardly from the respective one of said semi-cylindrical body portions upon which said male engaging lug and the male engaging tongue carried thereby are mounted; and a pair of spaced, flexible, generally semi-cylindrical bands interconnecting the opposite side edges of said body portions, with each one of said bands extending between and interconnecting the male engaging lug on one of said semi-cylindrical body portions with the female receptor lug on the other of said semi-cylindrical body portions, and said semi-circular bands being spaced axially from each other by a distance which is a major portion of the total axial dimension of each of the two semi-cylindrical body portions, said bands yieldingly holding said body portions in variably spaced relation to each other so that said male engaging tongues can enter, and move into, said female receptor slots, and said semi-cylindrical body portions can pivot from an open, spaced apart status, in which said diametric planes of each of said body portions are in coplanar alignment, to a snap-engaged status in which the semi-cylindrical body portions are snap-engaged and about each other to form a generally cylindrical tubular connector fitting.

2. A connector fitting as defined in claim 1 wherein each of said arcuate sections includes a partition rib positioned between said corrugation engaging ribs for separating and spacing the corrugated conduit sections interconnected by said connector fitting.

3. A connector fitting as defined in claim 1 wherein said female receptor lug, and said male engaging lug and the male engaging tongue carried thereby are axially dimensioned to bridge axially across said axially spaced corrugation engaging ribs carried on the concave inner surface of the respective body portion.

* * * * *